US005119906A

United States Patent [19]

Kondratuk

[11] Patent Number: 5,119,906

[45] Date of Patent: Jun. 9, 1992

[54] LIFT LOCKING SYSTEM

[75] Inventor: John J. Kondratuk, Kennan, Wis.

[73] Assignee: Marquip, Inc., Phillips, Wis.

[21] Appl. No.: 702,599

[22] Filed: May 17, 1991

[51] Int. Cl.[5] B60S 13/00

[52] U.S. Cl. 187/8.47; 187/8.59; 187/85; 271/261

[58] Field of Search 187/85, 86, 87, 88, 187/81, 8.59, 8.47; 271/201, 217; 254/93 L, 93 R, 2 R

[56] References Cited

U.S. PATENT DOCUMENTS

| | | | |
|---|---|---|---|
| 1,958,026 | 5/1934 | Walker | 187/8.59 |
| 2,238,573 | 4/1941 | Steedman | 187/8.59 |
| 2,624,546 | 1/1953 | Haumerson | 187/8.59 |
| 2,891,636 | 6/1959 | Krieger et al. | 187/8.59 |
| 4,457,401 | 7/1984 | Taylor et al. | 187/8.59 |

*Primary Examiner*—Robert P. Olszewski

*Assistant Examiner*—Kenneth Noland

*Attorney, Agent, or Firm*—Andrus, Sceales, Starke & Sawall

[57] ABSTRACT

A lift locking assembly for the vertically movable platform in a stacking apparatus includes toothed locking devices at each corner of the platform which are triggered simultaneously into engagement with correspondingly toothed racks by a triggering cable assembly attached in a manner to directly simulate movement of the platform lift chains. The triggering cables always remain taut, but become more highly loaded in tension as a result of platform movement without a corresponding movement in the lift chain or the hydraulic cylinder operating the lift chain, as a result of chain and/or hydraulic system failure. The four locking devices at the corners of the lift platform are interconnected by a common actuating linkage which may also be manually operated to separately lock the lift platform in any desired position for servicing or the like.

11 Claims, 3 Drawing Sheets

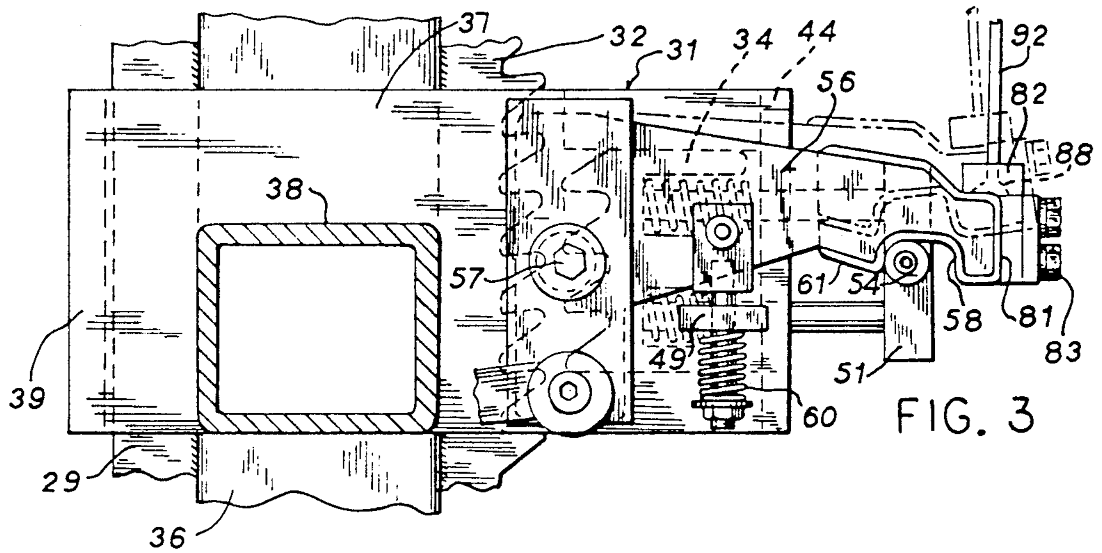
FIG. 3
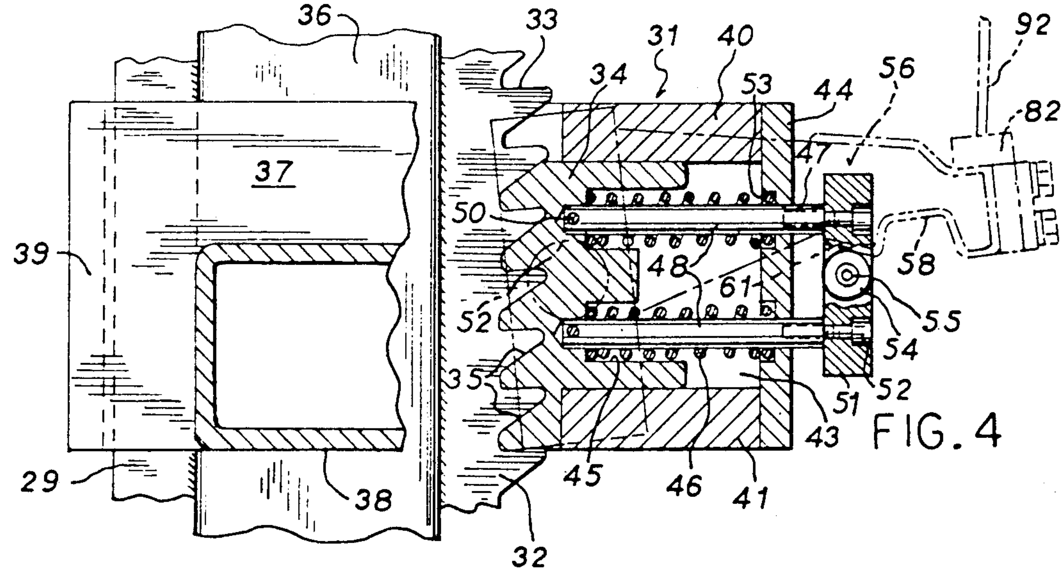
FIG. 4
FIG. 5
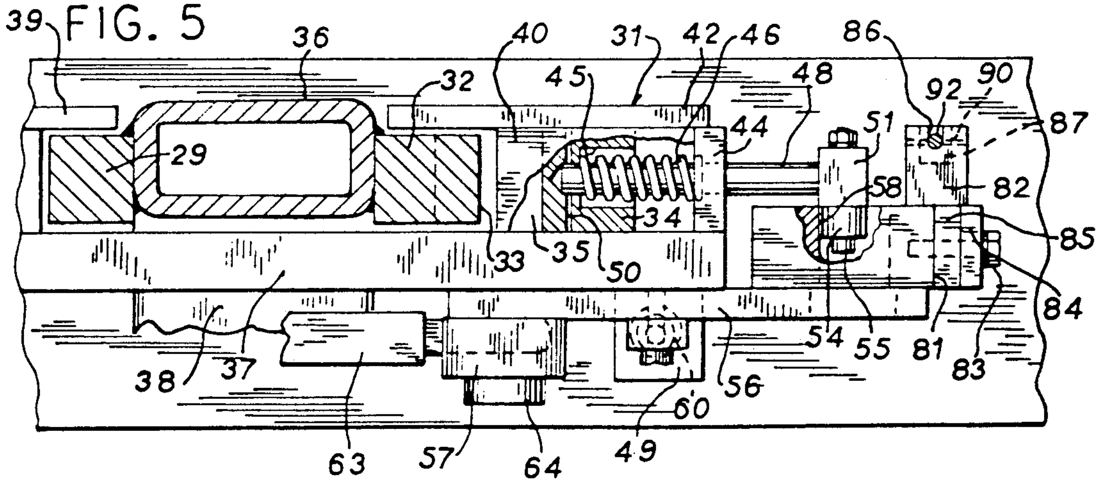

LIFT LOCKING SYSTEM

BACKGROUND OF THE INVENTION

The present invention relates to a lift locking system for an elevatable horizontal platform and, more particularly, to a system for automatically locking the platform of a chain driven sheet stacker against free fall movement in the event of a chain failure.

Chain driven stackers, such as those used to accumulate a vertical stack of corrugated paperboard sheets from a conveyed serial line of sheets and to discharge the sheet stack for further processing, are well known in the art. One such stacker is shown in U.S. Pat. No. 3,905,595. In a downstacker, sheets are fed onto a stacker platform initially positioned at the top of a supporting frame and the platform is continuously lowered as the stack of sheets builds.

In a somewhat similar device, commonly called an upstacker, sheets are fed by an infeed conveyor onto a vertically fixed platform and the infeed conveyor is raised vertically to follow the rising stack of sheets.

Similar hydraulically operated lift chain devices may be used with either a downstacker or an upstacker and one common lift chain arrangement is shown in U.S. Pat. No. 4,065,122, that configuration particularly adapted for an upstacker. In applying a similar lift chain arrangement to the platform of a downstacker, a pair of lift cylinders are mounted to the frame adjacent one edge of the platform, the rod end of the cylinder is attached to one end of the lift chain which extends vertically over an upper idler sprocket and downwardly to attachment at its other end to the lift platform. The edge of the lift platform opposite the lift chain attachments is supported by a pair of timing chains each secured at one end to the upper frame, extending vertically down over one idler sprocket at that edge of the platform, generally horizontally alongside the platform to and around a second idler sprocket adjacent the lift chain edge of the platform, and then vertically downwardly where it is secured at its other end to the lower frame. Because the lift chains and timing chains operate around toothed sprockets, the chains are maintained in synchronism and the lift platform is always maintained horizontal and level. The timing chains also help equalize the load on the platform and therefore the pressure in the lift cylinders in the situation when the stack of sheets is formed nearer one side of the lift platform.

In the event of failure of a lift chain or a timing chain, a corner of the platform will tend to free-fall and, if no other chain subsequently fails, may result in a canting and jamming of the lift platform. A potentially more serious situation could result from multiple chain failure and substantial free-fall of the entire lift platform. Therefore, various devices to rapidly lock the platform and prevent significant free-fall in the event of failure of a lift chain or cable have been devised.

Above identified U.S. Pat. No. 4,065,122 discloses a locking device attached directly to the end of the lift chain which is activated to bias rotatable locking jaws into contact with the lift track as a result of loss of tension in the lift chain because of failure. Similarly, U.S. Pat. No. 4,725,185 shows lift platform for the rear of a truck with similar rotatable locking jaws activated by loss of tension in the lift cable to engage the lift track and halt free-fall descent of the platform.

Because each of the foregoing locking devices is subject, to some extent at least, to frictional engagement between the engaging locking members and, consequently, potentially substantial component wear, the amount of free-fall descent of the platform after lift chain or cable failure may be substantially uncertain or even dangerously excessive.

It would be desirable, therefore, to have a lift locking system for a downstacker or the like which would be operable immediately upon lift or timing chain failure to positively lock the lift platform against free-fall descent, not only at the corner where chain failure occurs, but at all four corners of the platform. The locked system would allow convenient access to the downstacker to effect necessary repairs. It would also be advantageous to have such a system which is selectively actuable on a fully operative downstacker to lock the lift platform in any desired position, as for inspection or maintenance purposes.

SUMMARY OF THE INVENTION

In accordance with the present invention, a chain operated lift platform is supported and maintained level with oppositely disposed pairs of lift and timing chains and includes a locking device mounted on each platform corner which locking devices are simultaneously triggered to engage a vertical frame member and halt vertical movement of the platform in the event of failure of any lift or timing chain.

More particularly, the synchronized chain lifting mechanism includes a pair of vertically disposed lift chain segments attached to the ends of one edge of the platform and a pair of vertically disposed timing chain segments each operating about an idler sprocket which is attached to an end of the opposite platform edge. Power means are operatively connected to the lift chain segments to withdraw (or allow extension) of the lift chain segments to raise (or lower) the platform. The lift locking assembly includes a retractable locking device mounted adjacent each platform corner and normally held in an inoperative retracted position. Continuous locking tracks are fixed to the frame at each platform corner to extend vertically along the path of platform movement where each is engageable by a locking device when the device is released from its retracted position. Triggering cable means are operatively connected between each locking device on the platform edge mounting the timing chains and the power means in a manner which allows the cable means to simulate lift chain movement during synchronized movement of the platform and for releasing one of said locking devices in the event of failure of any chain segment. A linkage means interconnects all four locking devices for simultaneously releasing them all upon direct release of one of them.

The triggering cable means preferably comprises a pair of cable segments which are parallel to the lift chain and timing chain segments and are mounted to be withdrawn (or extended) in synchronism with the lift chain segments as the platform is raised (or lowered). In the preferred embodiment, the power means comprises a fluid cylinder for each lift chain segment, each of which cylinders is attached by its cylinder end to the lower portion of the frame with its rod end attached to a lift chain segment. Each cylinder is vertically disposed such that the lift chain segment operates around an upper lift chain sprocket whereby retraction of the cylinder rod raises the platform. Each triggering cable segment is likewise attached to the rod end of one of the cylinders.

Each locking track comprises a toothed rack and each locking device includes a toothed rack segment which is adapted to mesh directly with the toothed rack when released from its retracted position. Compression spring means are utilized to bias each rack segment into engagement with its associated rack. A cam follower is attached to each rack segment and cooperates with a pivotal cam arm which includes a cam follower recess adapted to engage and hold the cam follower, and thus the rack segment, in the retracted position. Each triggering cable segment is connected to a pivotal cam arm in a manner such that tension in the cable segment rotates the cam arm out of holding engagement with the cam follower. Tension spring means normally biases the cam arm against such rotation.

The locking device linkage includes a rigid link pivotally attached at one end to each cam arm and at the other end to a common pivotal connection for simultaneous movement of all rigid links and corresponding rotation of all cam arms. A manually operable trip mechanism may also be attached to the common pivotal connection to allow the locking devices to be released into locking engagement with the toothed racks independently of chain failure.

BRIEF DESCRIPTION OF THE DRAWINGS

FIG. 3 is an enlarged side elevation of a locking device of the present invention taken on line 3—3 of FIG. 2 and showing the device in the unlocked position.

FIG. 4 is a side elevation similar to FIG. 3 showing the locking device in the locked position.

FIG. 5 is a top plan view of the locking device shown in FIGS. 3 and 4.

DETAILED DESCRIPTION OF THE PREFERRED EMBODIMENT

Figure 1:
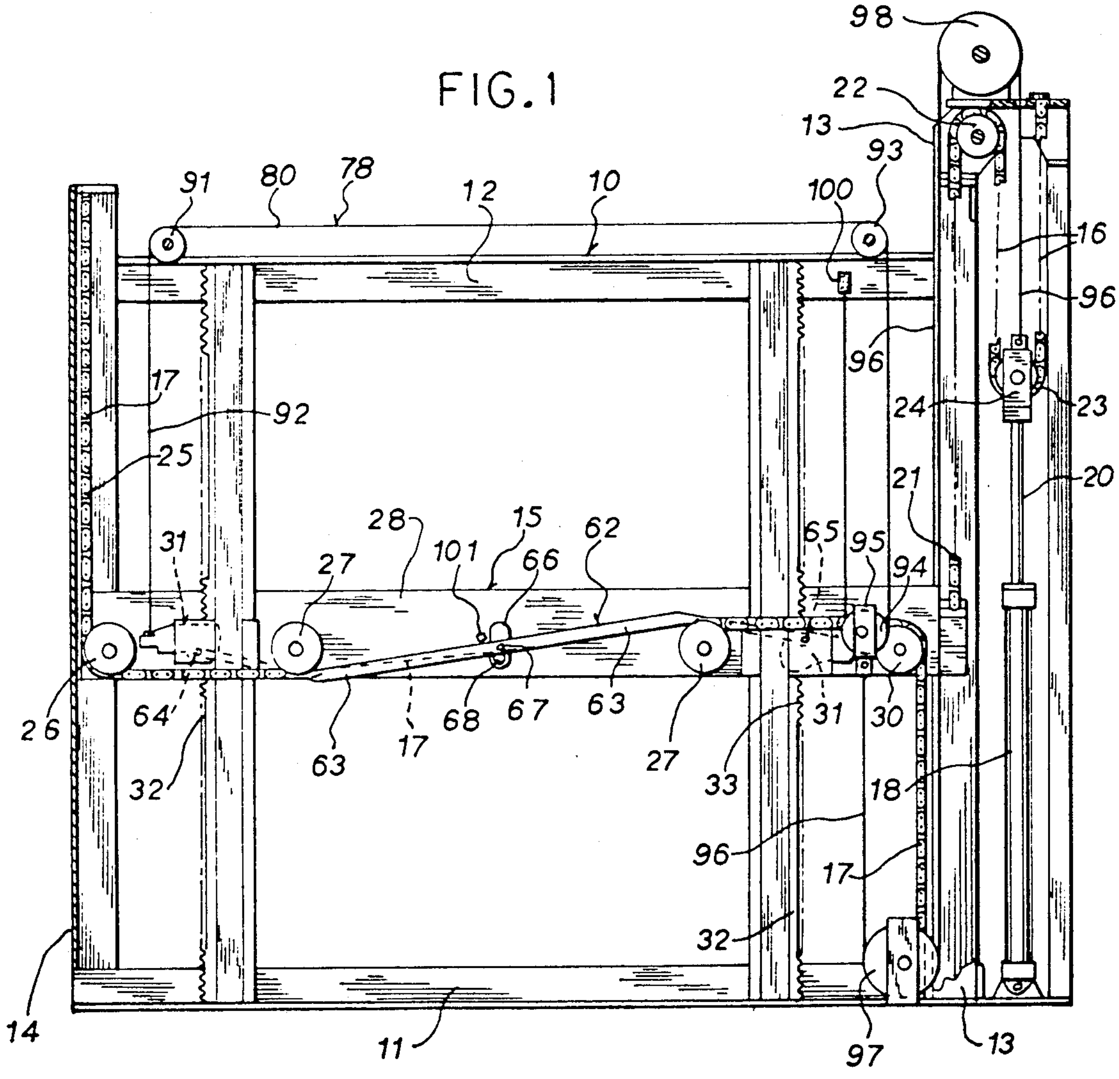
FIG. 1 is a front elevation view of a downstacker including the lift locking assembly of the present invention.
Figure 2:
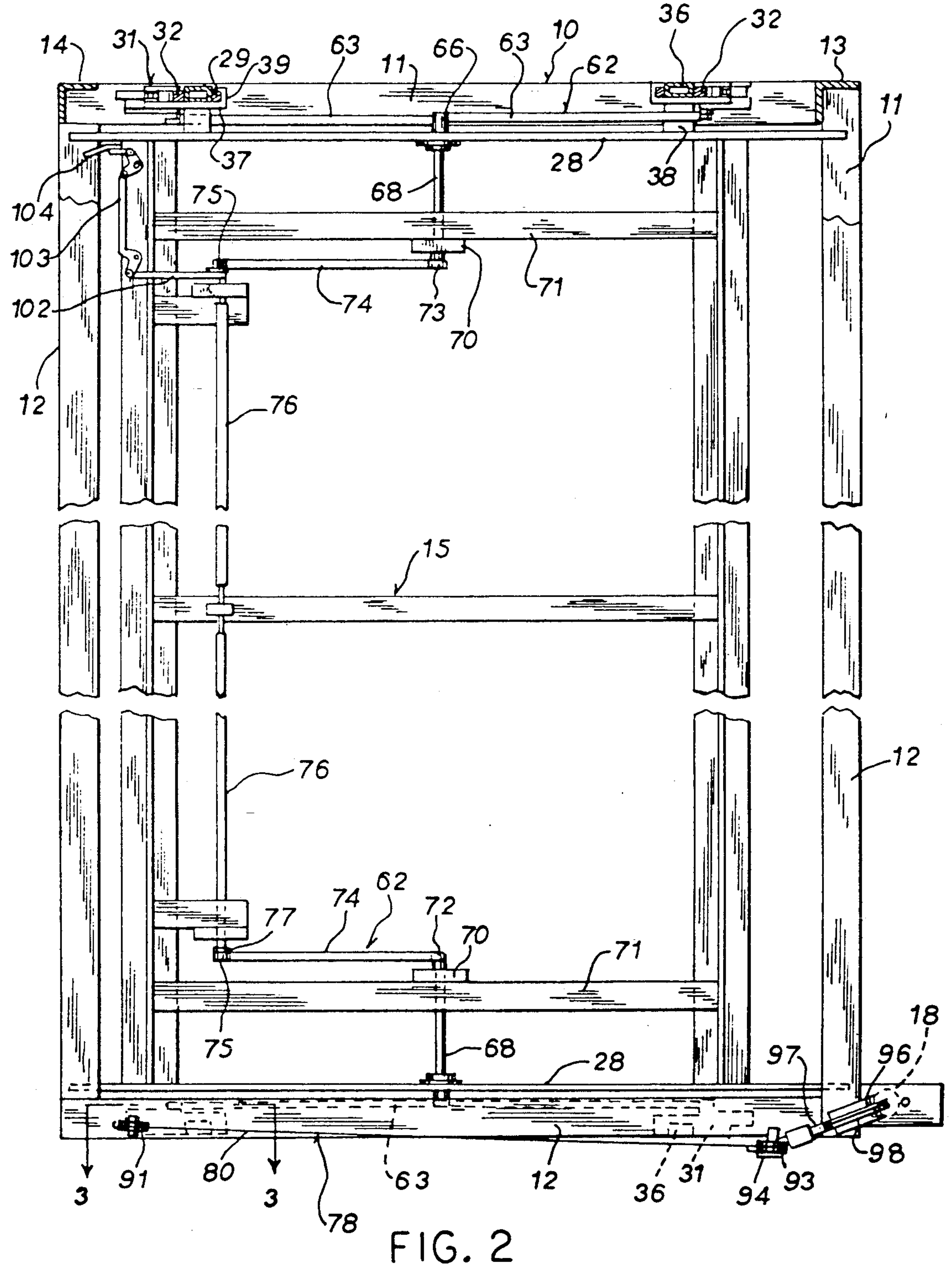
FIG. 2 is a top plan view of the apparatus shown in FIG. 1.

The downstacker shown in FIGS. 1 and 2 includes a generally rectangular box-like frame 10. The frame 10 includes a lower horizontal frame member 11 and an upper horizontal frame member 12 interconnected by pairs of right and left hand corner columns 13 and 14, respectively, as viewed in the drawing figures. A horizontal lift platform 15 is positioned within the frame 10 and guided therein for vertical movement between the upper and lower frame members 12 and 11, respectively. The platform 15 typically includes a supporting surface comprising a powered live roller (not shown) for directly discharging palletized stacks of corrugated paperboard sheets off of the platform 15 in its lowermost position. Before loading, the platform 15 is raised to an uppermost position where sheets are serially fed onto the live roll conveyor (or a pallet resting thereon) by an infeed conveyor (not shown) and the platform 15 is slowly lowered as the stack of sheets builds such that each successive sheet is laid generally horizontally onto the top of the growing stack. In FIG. 1, the view is taken in the direction opposite sheet feed into the downstacker and discharge of the stack therefrom is typically at right angles to the infeed direction, to the left in FIGS. 1 and 2.

The lift platform 15 is raised and lowered by synchronously driven pairs of lift chains 16 and timing chains 17. In FIG. 1, one lift chain 16 and one timing chain 17 on the infeed side of the downstacker are shown. An identically constructed and operated lift chain 16 and timing chain 17 are located on the opposite side of the downstacker. Power to operate the lift platform is provided by a pair of identical single acting hydraulic cylinders 18, one for each lift chain 16. Each cylinder 18 is mounted with the base of the cylinder attached to the lower frame member 11 with the cylinder rod 20 extending vertically upwardly.

One end of the lift chain 16 is attached to a corner of the platform 15 and extends vertically upwardly in a first lift chain segment 21 to and around an upper lift chain idler sprocket 22, from which the lift chain extends vertically down and around a lower lift chain sprocket 23 rotatably mounted in a clevis 24 attached to the cylinder rod 20, and then vertically upward to an opposite end anchored above the upper frame member 12 to an extension plate attached to corner column 13. The clevis-mounted lower lift chain sprocket 23 acts as a distance multiplier to move the platform 15 twice the distance of movement of the cylinder rod 20.

Each timing chain 17 is anchored at its upper end to the upper frame member 12 near one left corner column 14 and extends vertically downwardly therefrom in a first timing chain segment 25 where it wraps 90° around a first timing chain idler sprocket 26 attached to a platform side frame member 28 near one corner of the platform 15. The timing chain 17 extends from the first idler sprocket 26 under and over a pair of intermediate idler sprockets 27 attached to the platform side frame member 28, around a second timing chain timing sprocket 30 mounted on the platform side frame member 28 near the corner where the lift chain 16 is attached, and from there vertically downwardly to its opposite end anchored to the lower frame member 11. The timing chains 17 support the left hand side of the lift platform 15 and help distribute torque and balance cylinder pressure when a stack of sheets is positioned in an unbalanced off-center position on the platform. By utilizing the positive engagement between the lift and timing chains 16 and 17, respectively, and their respective sprockets, the lift platform 15 is always maintained absolutely level. Thus, for example, as the cylinders 18 are retracted and the platform 15 raised, the first vertical lift chain segments 21 and the opposite first vertical timing chain segments 25 are all withdrawn and shortened by exactly the same amount.

As thus far described, the downstacker construction and operation is conventional and well known. However, because the lift and timing chain mechanisms of a downstacker must carry extremely high loads, it is desirable to provide some means to lock the lift platform 15 against vertical free-fall movement in the event one or more lift chains 16 or timing chains 17 should break.

Referring also to FIGS. 3-5, the present invention is directed to an assembly for locking the lift platform 15 against any significant downward movement in the event of failure of a lift or timing chain. Each of the four corners of the lift platform 15 is provided with a retractable locking device 31 which is normally held in an inoperative retracted position, but which is triggered to engage a toothed rack 32 attached to the frame 10 at each corner of the platform and extending vertically the full height of the frame. The rack teeth 33 may have a pitch of about 1 inch (about 25 mm) and the locking device 31 includes a toothed rack segment 34 having four teeth 35 of the same pitch and shape as the rack teeth 33 which are adapted to engage and fully mesh therewith when the rack segment 34 is released from its retracted position. As may be seen in FIG. 4, the teeth 33 of rack 32 and the teeth 35 of rack segment 34 are shaped to positively prevent downward movement of the platform after engagement, but allow unidirectional upward movement of the platform without overloading the chains even when the locking devices are engaged. In this situation, the rack segments 34 simply ratchet against the bias of compression springs 46 as the platform moves upwardly.

Each fixed rack 32 is attached to a vertically extending rectangular tubular member 36 attached at its ends to the upper and lower frame members 12 and 11, respectively. The locking device 31 is carried by a main supporting plate 37 which is secured to the platform side frame member 28 and spaced therefrom by a mounting member 38. The supporting plate 37 extends horizontally past the tubular member 36 and has an L-shaped bracket 39 attached to its edge and surrounding a vertical guide bar 29. An upper guide plate 40 and lower guide plate 41 are attached to and extend horizontally from the support plate 37 and are secured at their opposite edges to a vertically disposed side plate 42 to define a housing 43 within which the toothed rack segment 34 can slide horizontally into and out of engagement with the stationary toothed rack 32. The rear of the housing 43 is enclosed by a backing plate 44 extending between and attached to the support plate 37 and the side plate 42. The rear of the rack segment 34 is provided with a pair of vertically spaced horizontal lined holes 45 for receipt of compression springs 46 which act to bias the rack segment 34 into engagement with the rack when the former is released from its retracted position shown in FIGS. 3 and 4. The backing plate 44 is provided with a pair of through bores 47 axially aligned with the blind holes 45 in the rack segment 34. A solid guide pin 48 is secured axially in each blind hole 45 with a cross pin 50 positioned in the rack segment 34 and through the end of the guide pin. Each guide pin 48 extends through the coiled compression spring 46, the through bore 47 to the outside of the housing 43 where it is secured to a cam follower mounting member 51 by a bolt 52. The inside face of the backing plate 44 includes a pair of recessed counterbores 53 for the through bores 47 to provide retaining recesses for the ends of the compression springs 46.

To releasably hold the rack segment 34 in its retracted position, a cam follower 54 is rotatably attached to one vertical face of the cam follower mounting member 51 with a mounting bolt 55. A cam arm 56 is pivotally attached to the main support plate 37 with a horizontal cam arm pivot 57 in a manner to allow the free end of the cam arm 56 to move upwardly to release the cam follower 54 from engagement with a cam follower recess 58 in the end of the cam arm. When the cam follower 54 is released, the rack segment 34 is rapidly driven into engagement with the rack 32 by extension of the compression springs 46. The cam arm 56 is normally biased downwardly to prevent inadvertent release of the cam follower 54 by a tension spring 60 extending between the cam arm 56 and a bracket 49 attached to the supporting plate 37. When the cam arm 56 is rotated upwardly against the tension of spring 60 until the cam follower rides out of the recess 58, the cam follower moves horizontally with the cam follower mounting member 51 along an angled cam surface 61 on the underside of the cam arm 56 to the locked position shown in FIG. 4.

Each of the four locking devices 31 is interconnected by a common linkage 62 such that unlocking upward movement of any cam arm 56 automatically results in similar movement of all the remaining cam arms, whereby all four rack segments 34 are simultaneously fired into locking engagement with their respective toothed racks 32. A main link member 63 is pivotally attached at one end to the cam arm 56 at a point offset vertically from the cam arm pivot 57 such that an axial force on the main link member 63 will cause rotation of the cam arm 56. Looking first at the locking device 31 associated with the timing chain segment 25 on the left hand side of FIGS. 1 and 2, the cam arm 56 is provided with a lower link pivot 64 such that a force pushing the link member 63 toward the cam arm 56 is required to cause the required cam arm rotation needed to release the cam follower and attached rack segment 34 from its retracted position. In the other locking device 31 associated with the lift chain segment 21 on the right hand side of the platform 15 in FIGS. 1 and 2, the link member 63 is attached to the cam arm 56 at an upper link pivot 65 such that a force tending to pull the link member 63 away from the cam arm 56 is required to produce the necessary rotation of the cam arm and release of the rack segment 34. The ends of the link members 63 opposite their pivots 64 and 65 are attached to a link plate with a common link plate pivot 67. The link plate 66 is fixed to a rotatable stub shaft 68 mounted for rotation in the platform's side frame member 28 and extending inwardly under the platform where the other end is rotatably mounted in a stub shaft support 70 mounted on a platform frame member 71. The common link plate pivot 67 for the two link members 63 is offset from the axis of the stub shaft 68 such that rotation of the stub shaft (in a counterclockwise direction as viewed in FIG. 1) will push the left hand link member 63 toward the cam arm 56 to which it is attached and pull the right hand link member 63 away from the cam arm 56 to which it is attached in a manner resulting in upward rotation of both cam arms in opposite directions to release their respective rack segments 34.

An intermediate link plate 72 is fixed to the inner end of the stub shaft 68 and an intermediate link member 74 is attached to the intermediate link plate by an offset intermediate pivot 73. The other end of the intermediate link member 74 is pivotally attached to a second intermediate link plate 75 fixed to the end of a main torque shaft 76. An intermediate pivot 77, similar to intermediate pivot 73, mounts the other end of the link member 74 to the second link plate 75 similarly offset from the axis of the torque shaft 76. The torque shaft 76 is journaled for rotation in the framework for the platform 15 and extends completely across the underside thereof where it is attached at its opposite end to an intermediate link member 74 forming part of an identical linkage for the two locking devices 31 on the opposite corners of the platform. That half of the linkage is identical to the half just described with respect to the locking devices shown in FIG. 1 and described hereinabove.

A pair of identical triggering cable assemblies 78, only one of which is shown in FIG. 1, operate to directly release one rack segment 34 of a locking device 31 in the event of failure of any lift chain 16 or timing chain 17, resulting in simultaneous locking engagement of all locking devices by virtue of operation of the interconnecting linkage 62. The triggering cable assembly to be described hereinafter must simulate lift chain movement and, by virtue of the distance-multiplying arrangement of the lift chain 16 provided by the clevis-mounted lower lift chain sprocket 23, each triggering cable assembly 78 must be provided with a similar arrangement. Both triggering cable assemblies are identical to the one specifically shown in FIG. 1 to which reference is specifically made.

A first triggering cable 80 is attached at one end to the end of the cam arm 56 opposite the cam arm pivot 57 of one of the locking devices 31 attached to the platform 15 near the edge supported by the timing chain segments 25. The cam arm 56 of this device is slightly different than the cam arms for the locking devices 31 on the opposite edge of the platform adjacent the lift chain segments 21. In particular, a cam arm 56 to which the first triggering cable 80 is attached includes a vertically disposed rear mounting face 81 to which an irregularly shaped cable mounting block 82 is attached with a pair of machine screws 83 extending through an outer face plate 84, spacer 85 and into suitably tapped holes in the mounting face 81. The mounting block 82 includes a slot 86 for receipt of the first cable 80 and an open interior portion 87 into which an enlarged end 88 on the cable 80 may be inserted and held with a cross pin 90 extending through the mounting block 82 and cable end 88.

The first triggering cable 80 extends vertically upwardly to a first upper cable sheave 91, the vertical section of the cable 80 comprising a first triggering cable segment 92. Triggering cable segment 92 is oriented and attached to the lift operating mechanism to directly simulate shortening or lengthening movement of the first lift chain segment 21 and the first timing chain segment 25 as the platform 15 is raised or lowered. From the first upper cable sheave 91, the first triggering cable 80 extends generally horizontally over the upper frame member 12 to a second upper cable sheave 93 attached to the frame near the edge of the platform supported by the lift chains. The first cable 80 makes a 90° wrap around the second upper cable sheave 93 and extends vertically downwardly to make a 180° wrap around an intermediate floating sheave 94 mounted in a clevis 95, from which it extends vertically upwardly to its end anchored in the upper frame member 12. A second triggering cable 96 has one end attached to the clevis 95 and extends vertically downwardly to a 180° wrap around a lower main sheave 97 attached to the lower frame member 11, from which it extends upwardly to a 180° wrap around an upper main sheave 98 mounted above the upper lift chain sprocket 22. From the upper main sheave 98, the second triggering cable 96 extends vertically downwardly to its other end which is attached to the clevis 24 mounting the lower lift chain sprocket 23. As may best be seen in FIG. 2, the upper and lower main sheaves 98 and 97, respectively, are canted slightly to carry the second triggering cable 96 out of the plane of the lift chain 16 and away from the platform side frame member 28 and locking device attached thereto. This also allows unrestricted vertical movement of the floating sheave 94 which interconnects the first and second triggering cables 80 and 96, respectively. The arrangement of the triggering cables and their respective sheaves results in movement of the floating sheave 94 in the opposite direction and at half the distance that is moved by the platform 15. With this arrangement, the triggering cables always remain essentially taut through the full range of movement of the lift and timing chains 16 and 17 such that any vertical movement of the lift platform 15 without a corresponding direct movement of an attached lift or timing chain will result in increased tension in the triggering cable assembly 78 and, in particular, cause an increased tension in the first cable segment 92 to pull upwardly on the cam arm 56 to which it is attached to release the locking mechanism, as previously described. Because the first cable segments 92 for both locking devices mounted adjacent the first timing chain segments 25 will react directly to timing chain failure, the triggering tensile force in the cable segment 92 is normally imposed directly by free-fall movement of that platform edge.

In the event of a lift chain failure, however, platform movement and/or retracting movement of the cylinder rod 20 carrying the failed chain combine to transmit a triggering load to one of the cable segments 92. If a lift chain 16 breaks, the corner of the platform 15 to which it was attached will immediately tend to drop vertically as will the corner at the opposite end of the side frame member 28 because the supporting timing chain segment depends on the support from the lift chain. In addition, because both hydraulic cylinders 18 are pressurized from a common source, loss of load in one cylinder by virtue of lift chain failure will cause a rapid unbalanced flow into that cylinder, amplified by the high load pressure remaining in the other cylinder, causing the cylinder rod 20 in the failed chain cylinder to rapidly retract and resulting in an increased tension force being imposed in the cable segment 92. The combined result is a triggering release of the locking device to which the cable segment is attached in the same manner previously described.

To assure that the triggering cable assembly 78 remains taut and to provide some relief against non-triggering tension loads in the cables, the upper end of the first cable 80 may be attached to the upper frame member 12 with a tension spring mount 100.

It is also desirable to immediately shut off the pump supplying hydraulic fluid to the cylinders 18 in the event of chain failure and actuation of the lift locking devices. As may best be seen in FIG. 1, the rotatable link plate 66 is adapted to engage a limit switch actuator 101 in response to movement of the commonly attached link members 63 to shut off power to the hydraulic pump.

Referring particularly to FIG. 2, the lift locking assembly of the present invention includes means for manually triggering the locking devices to, for example, allow the lift platform 15 to be positioned and securely held for inspection, maintenance, or repair. Adjacent one platform corner supported by a timing chain segment 25, a manual actuator link 102 is pivotally attached to the second intermediate link plate 75 on the end of the torque shaft 76. The other end of the actuator link 102 is pivotally attached through a toggle linkage 103 to a trip lever 104, all attached to the platform frame. Actuation of the trip lever results in movement of the linkage 62 interconnecting the locking devices 31, in the manner previously described, causing all rack segments 34 to be released from their retracted positions and driven under the force of the respective compression springs 46 into engagement with the toothed racks 32.

The system of the present invention is also believed to be adaptable to lock the platform against free-fall movement in the event of hydraulic failure and consequent loss of pressure, such as might result from a hose break. In a slightly modified arrangement, the first triggering cables 80 may be attached in a crisscross fashion such that the horizontal run between the first and second upper cable sheaves 91 and 93 are diagonally over the upper frame member 12. Such an arrangement may be useful, for example, to compensate for the tendency of the lift platform 15 to tilt as a result of loss of cylinder pressure beyond the slight amount needed to tension the triggering cable to activate the locking devices.

To retract the rack segments 34 from their locked positions shown in FIG. 4, each rack segment is manually retracted and reset in its inoperative position. One means of accomplishing retraction of the rack segments 34 utilizes a lever arm having a pair of spaced pins extending at right angles from one end of the lever arm. The pins are spaced just slightly farther than the distance between the backing plate 44 and the cam follower mounting member 51 in the retracted position. By placing one pin in a recess on the axis of the cam follower 54 and the other against the outside face of the backing plate 44 in the rack engaged position, movement of the lever arm will force the cam follower and cam follower mounting member 51 against the force of the compression springs 46 out to the indicated position just beyond that shown in FIG. 3. A wedging block is then placed between the backing plate 44 and the mounting member 51 to hold that position and the operator proceeds to retract the other three rack segments 34 in the same manner. When the fourth rack segment is retracted, the entire linkage 62 is freed and the cam arms 56 are allowed to drop downwardly causing the cam follower recesses 58 to engage their respective cam followers. The lever arm may then be utilized to again slightly bias the cam follower mounting member 51 away from the backing plate 44 to allow each of the first three wedges to drop out of its wedging position.

Although the lift locking apparatus of the present invention has been described particularly for application to a chain-operated lift system, the invention may also be applied to the lift platform for the stacker or any similar device utilizing lifting cables or ropes, instead of lift and timing chains as described herein. For example, a typical cable-operated platform lift might utilize a lifting cable attached to each corner of the platform and wound onto a suitable drum arrangement. Suitable interconnection of the winding drum arrangement may be utilized to preserve platform leveling, which the timing and lift chains and their associated sprockets provide in the described embodiment. Cable triggering means similar to that described above may be attached at one or more points to a platform to simulate lift cable movement, also as previously described. Furthermore, the lift locking assembly of the present invention could, if desired, be adapted for use on a lift system using a completely different apparatus for raising and lowering of the platform, such as a rack and pinion gear drive or the like.

Various modes of carrying out the present invention are contemplated as being within the scope of the following claims particularly pointing out and distinctly claiming the subject matter which is regarded as the invention.

I claim:

1. A lift locking assembly for an elevatable horizontal platform of the type movable vertically in a stationary supporting frame and having a synchronized lifting mechanism, including power means, to provide vertical platform movement and to maintain the platform level during vertical movement, said lift locking assembly comprising:

a retractable locking device mounted on the platform adjacent each corner and normally held in an in inoperative retracted position;

a continuous locking track for each locking device fixed to the frame, extending vertically along the path of movement of the platform and engageable by the locking device when released from its retracted position;

triggering cable means independent of the lifting mechanism operatively connecting at least one locking device to the power means for simulating synchronized movement of the platform with respect to the frame and for releasing said locking device in the event of loss of synchronized movement; and, linkage means interconnecting said locking devices for simultaneously releasing all of said locking devices upon release of said one locking device.

2. The assembly as set forth in claim 1 wherein said lifting mechanism includes a flexible, substantially nonelastic strand supporting each corner of the platform, and power means for moving said strands and platform relative to the frame to raise and lower the platform.

3. A lifting locking assembly for an elevatable horizontal platform of the type movable vertically in a stationary supporting frame and having a synchronized lifting mechanism including a pair of vertical lift chain segments attached to the ends of one edge of the platform and a pair of vertical timing chain segments each operating about a sprocket attached to one end of the opposite edge of the platform, and power means operatively connected to the lift chain segments for withdrawing the lift chain segments and raising the platform, said lift locking assembly comprising:

a retractable locking device mounted on the platform adjacent each corner and normally held in an inoperative retracted position;

a continuous locking track for each locking device fixed to the frame, extending vertically along the path of movement of the platform and engageable by the locking device when released from its retracted position;

triggering cable means independent of the locking mechanism operatively connecting each locking device on the ends of said opposite edge of the platform and the power means for simulating lift chain movement during synchronized movement of the platform and for releasing one of said locking devices on said opposite edge in the event of failure of any chain segment; and, linkage means interconnecting said locking devices for simultaneously releasing all of said locking devices upon release of said one locking device.

4. The assembly as set forth in claim 3 wherein said triggering cable means comprises a pair of cable segments parallel to the lift chain and timing chain segments and adapted to be withdrawn in synchronism with the lift chain segments as the platform is raised.

5. The assembly as set forth in claim 4 wherein said power means comprises a fluid cylinder for each lift chain segment, each cylinder having a cylinder end attached to the frame and a rod end attached to a lift chain segment.

6. The assembly as set forth in claim 5 wherein each triggering cable segment is attached to the rod end of one of said cylinders.

7. The lift locking assembly as set forth in claim 4 wherein said locking track comprises a toothed rack and said locking device comprises:

a toothed rack segment adapted to mesh directly with said toothed rack;

compression spring means biasing said rack segment into meshing engagement with said rack;

a cam follower attached to said rack segment; and, a pivotal cam arm including a cam follower recess adapted to engage and hold said cam follower to retain said rack segment in the retracted position.

8. The assembly as set forth in claim 7 wherein each triggering cable segment is connected to a pivotal cam arm in a position to rotate said arm and cause said cam follower recess to move out of engagement with said cam follower, and further including tension spring means for biasing said cam arm against rotation.

9. The assembly as set forth in claim 8 wherein said linkage means comprises a rigid link pivotally attached at one end to each cam arm and at the other end to common pivotal connection means for simultaneous movement of said rigid links and rotation of all cam arms.

10. The assembly as set forth in claim 9 including a manually operable trip mechanism attached to said common pivotal connection means for releasing said locking devices independently of chain failure.

11. A lift locking assembly for a rectangular horizontal platform movable vertically in a stationary supporting frame and having a synchronized chain lifting mechanism including a pair of lift chain segments attached to and extending vertically upward from the ends of one edge of the platform, a pair of timing chains each anchored at opposite ends to the top and bottom of the frame and extending around a pair of idler sprockets mounted on said one edge and the opposite edge of the platform, such that the end of the timing chain segment anchored to the top of the frame extends vertically downward to engage the idler sprocket mounted on said opposite edge and the end of the timing chain anchored to the bottom of the frame extends vertically upward to engage the idler sprocket mounted on said one edge, and power means operatively connected to said lift chains for withdrawing the lift chains to synchronously shorten the chain segments and raise the platform, said lift locking assembly comprising:

a continuous vertical locking rack attached to the frame adjacent each corner of the platform and extending along the path of platform movement;

a locking device mounted on each corner of the platform adjacent a locking rack, each locking device having a rack segment, means for biasing the rack segment into locking engagement with said adjacent locking rack, and means for holding said rack segment against said biasing means in an inoperative retracted position;

a triggering cable interconnecting each locking device at said opposite edge of the platform and the power means in a manner to simulate lift chain movement and remain in a normally taut condition during synchronous movement of said chain segments;

each triggering cable having a vertical cable segment including the connection to said locking device which cable segment is adapted to be loaded beyond its normally taut condition in the event of failure of one of a pair of lift and timing chains and to release said rack segment holding means; and, a linkage interconnecting the rack segment holding means for each locking device to simultaneously release all of said rack segments into locking engagement.

* * * * *